April 17, 1962 W. R. SHAVER 3,029,747
COMPARTMENTIZER MOUNTING AND LOCKING ARRANGEMENT
Filed Aug. 20, 1959 3 Sheets-Sheet 1

Inventor
William R. Shaver
By Wayne Morris Russell
Attorney

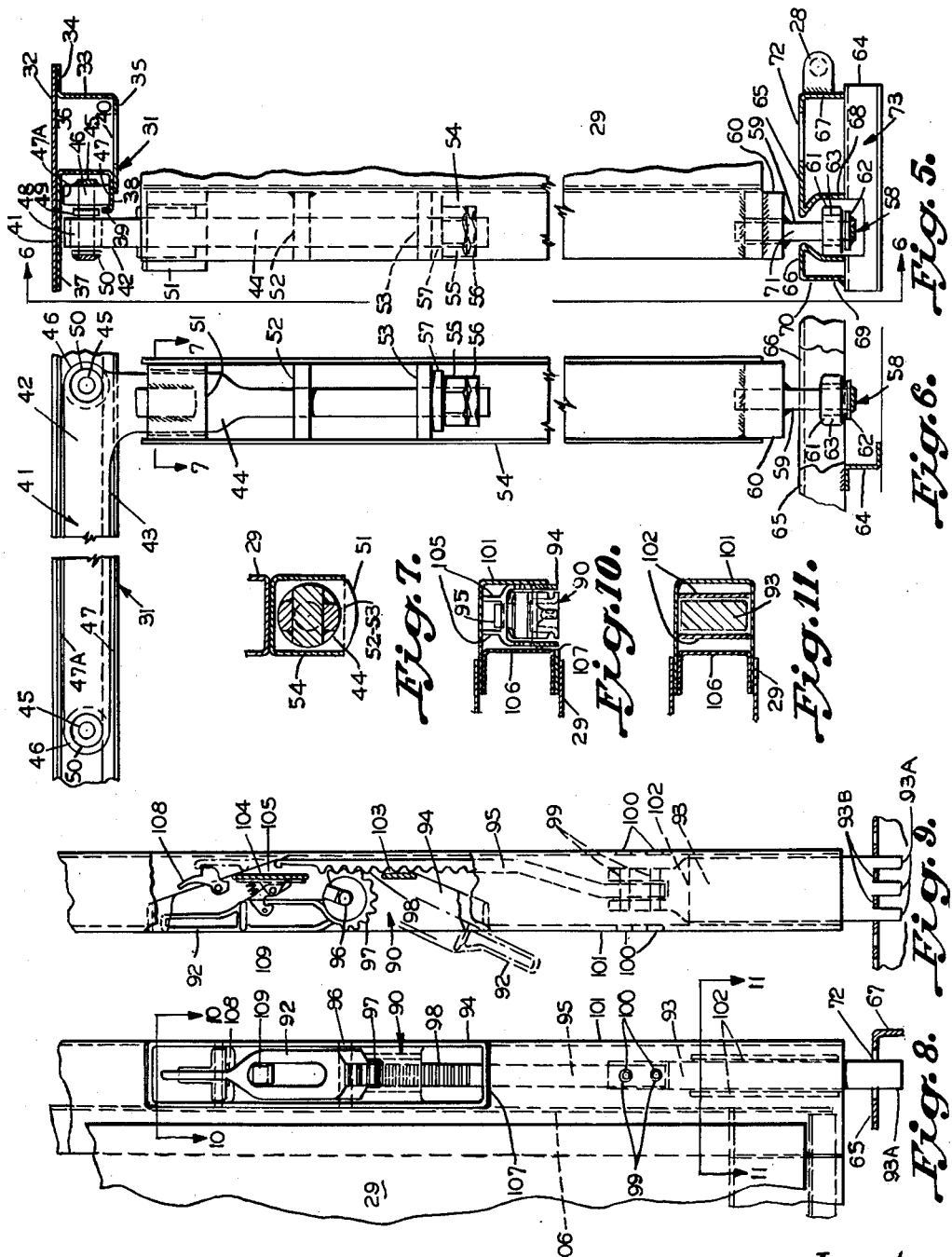

April 17, 1962 W. R. SHAVER 3,029,747
COMPARTMENTIZER MOUNTING AND LOCKING ARRANGEMENT
Filed Aug. 20, 1959 3 Sheets-Sheet 3
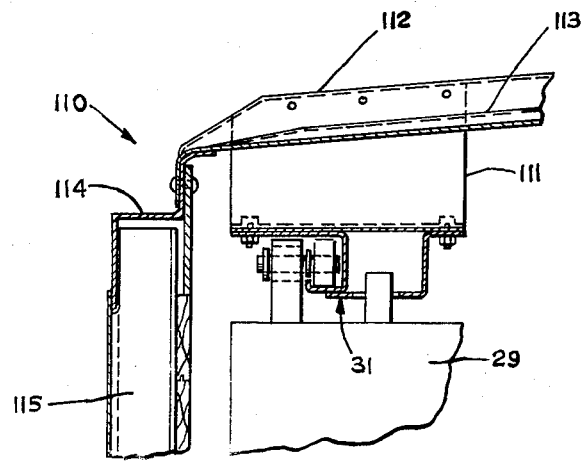
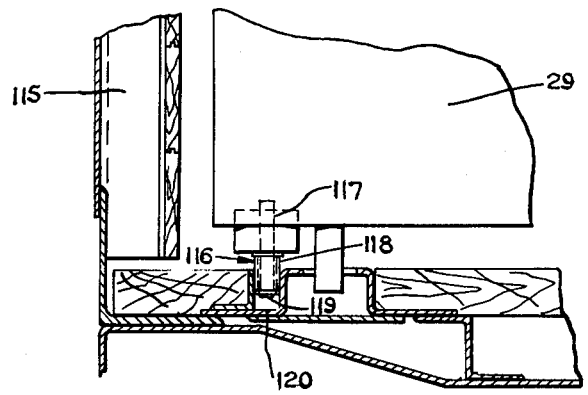
Fig. 12.
Inventor
William R. Shaver
By Wayne Morris Russell
Attorney

United States Patent Office 3,029,747
Patented Apr. 17, 1962

3,029,747
COMPARTMENTIZER MOUNTING AND
LOCKING ARRANGEMENT
William R. Shaver, Hammond, Ind., assignor to Pullman
Incorporated, Chicago, Ill., a corporation of Delaware
Filed Aug. 20, 1959, Ser. No. 835,000
11 Claims. (Cl. 105—376)

This invention relates to a mounting and locking arrangement for a compartmentizer for use in freight vehicles including refrigerator vehicles and other types of insulated vehicles.

The principal object of the invention is to provide a mounting and locking arrangement for a compartmentizer for use in freight vehicles which meets the requirements as to strength demanded by the heavy duty service to which such vehicles are subjected.

An important object of the invention is the provision of a trolley arrangement having a vertical depending pivot arm which is pivotally connected to the gate of a compartmentizer at its upper outer edge whereby the gate is suspended in a freight vehicle.

Another object is to provide an overhead longitudinally disposed trackway which is secured to the ceiling structure or the roof structure of a freight vehicle adjacent to the side wall thereof for movably supporting the trolley of a compartmentizer gate.

A further object comprehends a roller type stabilizer and pivot means which is secured to the gate of a compartmentizer at its lower edge in vertical alignment with an upper pivotal arrangement and thereby providing a hinging means for swinging the gate to and from a position parallel with the side wall of a freight vehicle including an outwardly directed position wherein the gate extends through the side door opening of the vehicle.

A still further object contemplates a trackway longitudinally disposed at substantially the level of the floor of a freight vehicle adjacent to the side wall thereof for retaining the stabilizer and pivot means of a compartmentizer gate and for guiding the same during longitudinal movements of the gate.

Still another object is to provide individual manually operated slide bolt locks at the upper and lower edges of a compartmentizer gate. The slide bolts each having a fork-shaped end portion with three fingers for engagement with keeper slots for locking the gate in a transverse position in a freight vehicle and for supporting the gate in the locked position at the lower edge slide bolt locks.

And still another object is the provision of longitudinally disposed keeper members at the floor and at the ceiling or at the floor and adjacent to the roof of a freight vehicle and the keeper members each having a plurality of keeper slots longitudinally spaced at close intervals for engagement with the slide bolt of a compartmentizer gate lock thereby providing means for locking the gate transversely in the vehicle at various selective locations and for supporting the gate in the locked position at floor keeper members.

The foregoing and other objects of the invention are attained by the construction and arrangement illustrated in the accompanying drawings wherein FIG. 1 is a transverse sectional view through the body of a railway refrigerator freight vehicle showing a compartmentizer in transverse position in the vehicle including the mounting and locking arrangement of this invention;

FIG. 5 is a vertical fragmentary sectional view to a larger scale showing the upper and lower outer corner portions of one of the compartmentizer gates in relationship with the upper and lower trackways, the trolley and upper hinge pivot and the stabilizer and lower hinge pivot;

FIG. 6 is a vertical fragmentary sectional view taken on line 6—6 in FIG. 5;

FIG. 7 is a horizontal sectional view taken on line 7—7 in FIG. 6;

FIG. 8 and FIG. 9 are elevational views showing one of the slide bolt locks applied to the lower inner corner portion of one of the compartmentizer gates;

FIG. 10 is a horizontal sectional view taken on line 10—10 in FIG. 8;

FIG. 11 is a horizontal sectional view taken on line 11—11 in FIG. 8; and

FIG. 12 is the same view as FIG. 5 except the vehicle body shown is a railway box car having no ceiling structure and no floor racks.

The compartmentizer referred to herein is a movable bulkhead arrangement which is used in freight vehicles for holding portions of the lading in place in the vehicle to prevent the lading from shifting and thereby causing damage to either or both the lading and the vehicle.

The compartmentizer includes a pair of mated gates each of which extends transversely substantially from one side wall of the vehicle to the longitudinal center line thereof and vertically substantially from the floor of the vehicle to adjacent the ceiling or the roof structure thereof. Each gate is movably mounted in the vehicle at its outer edge portion and may be easily moved longitudinally of the vehicle and positioned transversely of the vehicle at any of a plurality of selective locations lengthwise of the vehicle. Locking means are provided for securing the gates in transverse position at any of the selective locations. Hinging means also provided at the outer edge portion of each gate permits the gates to be swung to a position parallel with the side walls of the vehicle when the gates are not in use or for vehicle loading and unloading operations.

Figures 1, 2:
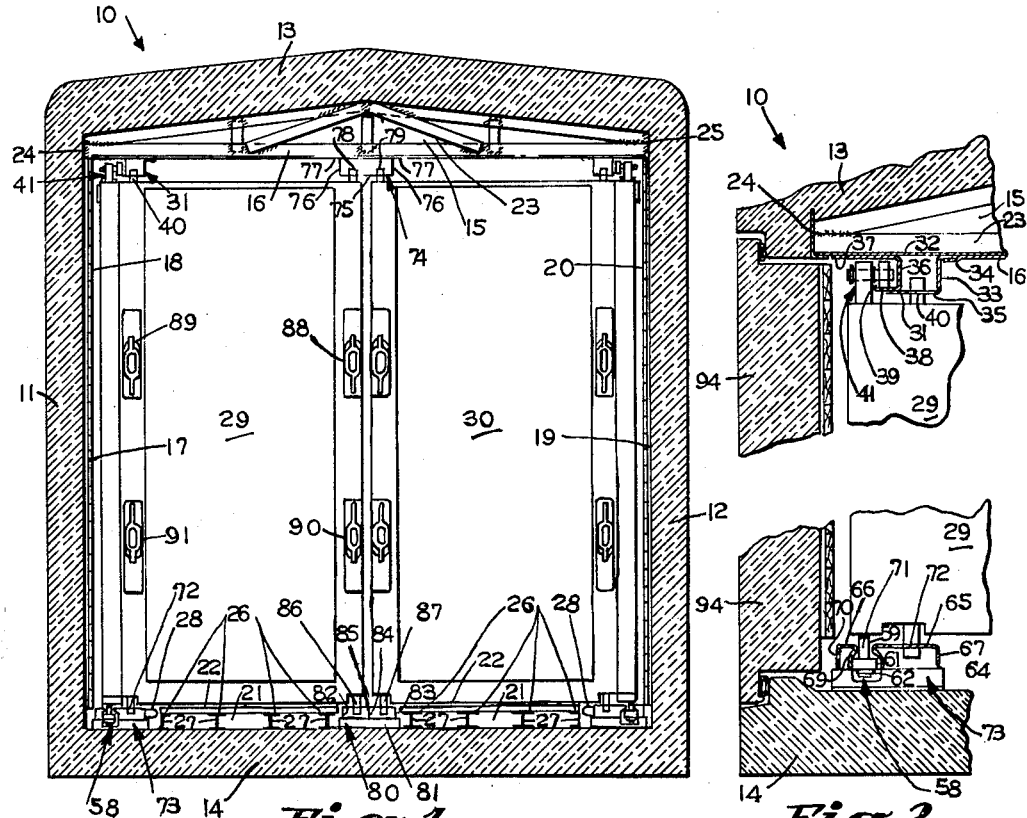
FIG. 2 is a vertical fragmentary sectional view to a larger scale through the side door and side door opening of the vehicle shown in FIG. 1.

In the drawings 10 represents a railway freight vehicle which, as shown in FIG. 1, is an insulated refrigerator type of car and includes side walls 11 and 12, a roof 13 and a floor 14. The car is the conventional type of refrigerator car wherein the required electro mechanical refrigeration equipment is located in a compartment at one end of the car. The conditioned air for refrigerating the car is discharged from the equipment compartment into air spaces which form an air duct system completely surrounding the refrigerator portion of the car. These spaces forming the air duct system includes space 15 above the ceiling 16, spaces 17 and 19 behind the side wall linings 18 and 20 respectively and space 21 below the floor racks 22. A plurality of transversely disposed ceiling truss members 23 are provide at longitudinally spaced intervals for supporting the ceiling 16. Each truss member 23 is secured at its ends to the inner side wall structures of the car by means of the longitudinally disposed side plate members 24 and 25. The open spaces in the truss members 23 permits distribution of the conditioned air in space 15. A certain amount of the air being distributed in space 15 is discharged into the refrigerator compartment through openings provided in ceiling 16. The remaining air in space 15 is distributed to the side wall air spaces 17 and 19 for the full length of the refrigerator and to air spaces which are provided at the ends of the refrigerator compartment behind the end linings and are similar to spaces 17 and 19. The air in the wall air spaces is discharged into the floor air space 21 at the lower ends of the wall spaces. The upright webs of the floor rack stringers 26 are provided with a plurality of holes 27 at longitudinally spaced intervals to permit free circulation of the air in space 21. The floor racks 22 are conventional open type which permits the air in space 21 to be discharged into the refrigerator compartment. The racks are made in sections and are hinged at 28 to facilitate cleaning.

FIG. 1 shows the two gates 29 and 30 of the compartmentizer in transverse position in the car. The two gates, including the mounting and locking arrangement of this invention, are identical except for certain detail parts of one gate being in opposite relationship with the same parts of the other gate due to the mated relationship of the gates in the car. For this reason it is considered sufficient to describe the application and details of the parts and assemblies comprising the invention as pertaining to one gate 29 and such parts and assemblies of the invention as are hereinafter described are intended to apply to both gates thereby covering the complete compartmentizer.

At the ceiling 16 closely adjacent to side wall lining 18 is a trackway 31 extending longitudinally of the car substantially from end to end of the refrigerator compartment. Trackway 31 is a generally box shaped section comprising a horizontal top plate member 32, an inner Z section member having a vertical web 33, an inwardly directed upper flange 34 and an outwardly directed lower flange 35 and an outer generally channel section member having a vertical web 36, an outwardly directed upper flange 37 and an outwardly directed lower flange 38 terminating in an upstanding flange 39. Trackway 31 is assembled by welding at the joints between the top plate 32 and the inwardly directed flange 34, between the top plate 32 and the outwardly directed flange 37 and between the outwardly directed flanges 35 and 38 and the complete trackway member 31 is secured by welding or other suitable means to the bottom surface of each ceiling truss member 23. A plurality of apertures 40 at longitudinally spaced intervals are provided in the outwardly directed flange 35. These apertures serve as slide bolt keepers as will later be described.

Numeral 41 represents a trolley arrangement which is mounted at trackway 31 and from which the compartmentizer gate 29 is suspended. The trolley arrangement 41 includes a main angular shape member 42 having a horizontal arm portion 43 and a vertical arm portion 44. The horizontal arm 43 is longitudinally disposed at trackway 31 and is supported by means of two horizontal pivot pins 45 which are longitudinally spaced to provide a support at each end of the arm. A roller 46 is mounted at the inner end portion of each pin 45 and the pins extend outwardly through the arm 43. The rollers 46 are each secured to the respective pins 45 and are peripherally engaged with the surface 47 of the trackway 31. A roller type bearing 48 is provided in arm 43 at each pin 45 to permit free rotation of the pins during longitudinal movements of the trolley. Loose spacer washer 49 is provided between the roller 46 and the arm 43 at each pin 45 and retaining washer 50 is secured to the outer end portion of each pin 45 for holding arm 43 in place transversely of the car. Upstanding flange 39 of trackway 31 serves as a guide for the rollers 46 during longitudinal movements of the trolley and also aids in guarding against any possibility of the rollers leaving surface 47.

If desired, an alternate arrangement may be provided for the trolley pivot pins 45 whereby the pivot pins are secured to the arm 43 instead of to the rollers 46 in which case a roller type bearing would be provided in each of the rollers to permit free rotation of the rollers during longitudinal movements of the trolley. Also in the alternate arrangement the retaining washers 50 would be secured to the inner end portions of the pins 45.

The vertical arm 44 of the angular member 42 is generally circular shape in section and while shown in two different sizes for the length of the arm, the arm may have a single circular shape section constant throughout the length of the arm. The arm 44 extends downwardly through cooperating holes in the guiding and supporting lugs 51, 52 and 53. The lugs 51, 52 and 53 are secured to the channel 54 which forms the outer vertical edge portion of the compartmentizer gate 29. Arm 44 is threaded at its lower end portion to match the threaded holding nut 55 and the lock nut 56 whereby the arm is secured to the gate 29. Thus a pivotal connection is provided between the gate 29 and the trolley arrangement 41 by which the gate is suspended. Wearing washer 57 is provided between the nut 55 and the lug 53. While holding nut 55 and lock nut 56 are shown, other equivalent fastening means may be used.

Figure 3:
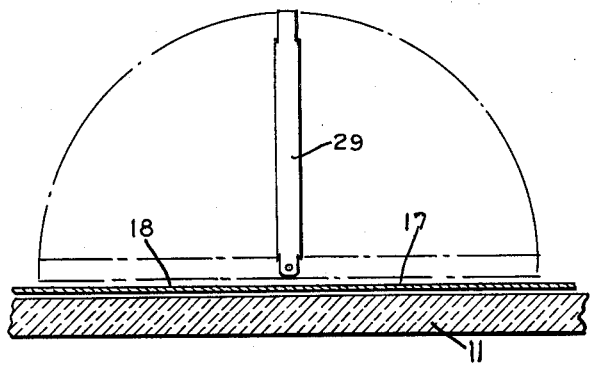
FIG. 3 is a horizontal sectional view showing one of the compartmentizer gates swung in various positions longitudinally and transversely of the vehicle.
Figure 4:
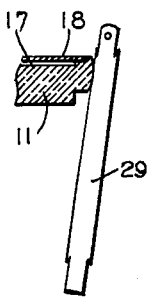
FIG. 4 is a horizontal sectional view showing one of the compartmentizer gates swung in an outwardly directed position with the gate extending through the side door opening of the vehicle.

The lower combined gate stabilizer and pivotal arrangement represented generally by numeral 58 is vertically aligned with the upper pivotal arrangement just described. The two pivotal arrangements function together to form a hinging means whereby the gate 29 may be swung to and from a position parallel with the side wall of the car including an outwardly directed position wherein the gate extends through the side door opening of the car as shown in FIGS. 3 and 4. The stabilizer 58 includes a vertically disposed pin 59 which extends upwardly through a hole in the supporting lug 60 and is secured thereto. The lug 60 is secured to the channel 54 of the gate 29. A roller 61 is provided over the pin 59 at its lower end portion and is held in place by means of washer 62 which is secured to the pin 59. A roller type bearing 63 is provided in the roller 61 to permit free rotation of the roller around the pin 59 during longitudinal movements of the gate 29.

At the floor adjacent the side wall lining 18 is a trackway generally represented by the numeral 73. The trackway 73 includes a plurality of transversely disposed support members 64 at longitudinally spaced intervals. The members 64 may be Z shape in section, or equivalent, secured to the underframe structure of the car. The two generally channel section members 65 and 66 are longitudinally disposed and extend substantially the full length of the refrigerator compartment. The downwardly directed flanges 67, 68, 69 and 70 are supported and secured at their outer ends to the upper flanges of the support members 64. The channels 65 and 66 are spaced transversely to form the groove or trackway 71 by which the roller 61 of the gate stabilizer 58 is guided during longitudinal movements of the gate 29. The upper inwardly directed offset portions of the flanges 68 and 69 overlap the outer edge of the roller 61 to prevent the roller from leaving the trackway while the gate is being shifted longitudinally of the car. A plurality of apertures 72 at longitudinally spaced intervals are provided in the horizontal web portion of channel 65. These apertures serve as slide bolt keepers as will later be described.

Referring to FIG. 2 which is a vertical sectional view showing the swingable insulated side door of the car in closed position. It will be noted that the upper and lower trackway and keeper members, 31 and 73 respectively, extend across the door opening to permit shifting of the gate 29 for the full length of the refrigerator compartment. The top edge 96 of the gate 29 is below the bottom surface 95 of the door header and the bottom edge 98 of the gate 29 is above the top surface 97 of the door opening threshold thereby providing sufficient clearance to permit the gate to be swung through the door opening to an outwardly directed position as shown in FIG. 4.

The proportionate length of the horizontal arm 43 of the trolley arrangement 41 stabilizes the gate 29 to prevent canting when the gate is in a position parallel to the side wall of the car. The couple forces due to canting of the gate are resisted at the roller 46 at the outer end of the horizontal arm 43 where the roller may be in contact with either the surface 47 or the surface 47A of the trackway 31. When the gate 29 is in a transverse position in the car, the gate is stabilized and prevented from canting by the roller 61 of the stabilizer arrangement 58, the roller being in contact with the inner surface of the flange 69 of the trackway 73.

A portion of each trackway 31 and 73 at the side door opening of the car is made removable to permit removal and replacement of the gate assemblage 29 including the upper trolley arrangement 41 and the lower gate stabilizer and pivotal arrangement 58.

It will be noted that the open edge of the gate 29 as provided by the outwardly directed flanges of the channel 54 permits easy access for the removal and replacement of the trolley arrangement 41.

The ceiling 16 comprises a plurality of sheets applied adjacent each other in widths to suit the longitudinal spacing of the ceiling trusses 23 and in lengths extending transversely of the car from the inwardly directed flange 34 of the trackway 31 on one side of the car to the inwardly directed flange of the identical but reversely applied trackway on the opposite side of the car. The sheets are secured to the flanges of the trackways and to the trusses 23.

Applied to the underside of the ceiling 16 at the longitudinal center of the car is a longitudinally disposed keeper member 74 extending substantially the full length of the refrigerator compartment. The member 74 comprises a horizontal web 75, two vertical webs 76 and two outwardly directed flanges 77 and is secured to the ceiling at the two flanges 77 where they intersect the transversely disposed trusses 23.

At the floor is a keeper member 80 also longitudinally disposed at the center of the car and extending substantially the full length of the refrigerator compartment. The member 80 includes a plurality of transversely disposed support member 81 at longitudinally spaced intervals. The members 81 may be Z shape in section, or equivalent, the same as supports 64 of trackway 73, and are also secured to the underframe structure of the car. The two downwardly directed flanges 82 and 83 are supported and secured at their outer ends to the upper flanges of the support members 81. The downwardly directed intermediate flange 84 serves as a stiffener for the horizontal web 85 being secured thereto at its upper edge.

Numerals 78 and 79 each represent a plurality of apertures at longitudinally spaced intervals in the horizontal web 75 of the keeper 74. Likewise numerals 86 and 87 each represent a plurality of apertures also at longitudinally spaced intervals in the horizontal web 85 of the keeper 80. Apertures 78 and 86 pertain to the gate assemblage 29 as herein described whereas apertures 79 and 87 pertain to the opposite gate assemblage 30.

Four individual, manually operated slide bolt locks 88, 89, 90 and 91 are provided for locking the gate 29 in transverse positions in the car. All four locks are identical except for application to the gate and for the operation of the locks. The locks 90 and 91 are applied as shown in FIGS. 8 and 9 and the operating handles 92 are moved upwardly to move the slide bolts 93 downwardly into the keeper slots 86 and 72 respectively, whereas the locks 88 and 89 are applied reversely from the locks 90 and 91 and the operating handles 92 are moved downwardly to move the slide bolts 93 upwardly into the keeper slots 78 and 40 respectively.

FIGS. 8, 9, 10 and 11 show the lock 90 applied to the gate 29 at the lower inner corner thereof. These illustrations also serve as a typical application for the other locks 88, 89 and 91. Each lock comprises a housing unit 94 into which other parts of the lock are assembled including the operating handle 92 which is pivotally mounted in the housing with hinge pin 96. The inner end toothed wheel portion 97 of the operating handle 92 together with the toothed rack portion 98 of the upper slide bolt member 95 forms a gear whereby the slide bolt is raised and lowered by manual operation of the handle 92. The upper slide bolt member 95 is connected to the lower slide bolt member 93 by means of fasteners 99 which are accessible through holes 100 provided on each side of the gate 29 through the flanges of the inner edge channel 101. The lower slide bolt 93 is slidably guided between web members 102 and the flanges of channel 101 at the lower portion of the gate. The upper slide bolt member 95 is slidably guided in the space between the rear flange of channel 101 and the rear web portions 103 and 104 of the housing unit 94 and between the webs 105 also a part of the housing unit 94.

The housing unit 94 is applied to the gate 29 through opening 107 in the front flange of channel 101 in the space between the webs of channels 101 and 106 and is secured thereto as shown in FIG. 10. The lock is arranged so that when the operating handle 92 is in the upright position the slide bolt 93 is down in the locked position in the selected keeper slots. Lowering operation of the handle raises the slide bolt to the unlocked position. Gravity type latch 108 holds the slide bolt up in the unlocked position and spring loaded latch 109 holds the handle up in the locked position. Both latches lock automatically and release manually. In the locked position the outer end of the operating handle is enclosed in the housing unit providing a flush gate surface whereby lading can be stored against the gate. In the unlocked position the outer end of the handle protrudes beyond the surface of the gate to serve as a warning signal that the slide bolt is not in the locked position as shown in phantom lines in FIG. 9.

The spaced intervals of the apertures or slide bolt keeper slots 40, 72, 78 and 86 are all equal and in vertical plane alignment thereby providing a plurality of selective locations for the placement of the gate 29 in transverse position in the car. As shown in FIG. 9 the lower end of the lower slide bolt member 93 is fork-shaped having three fingers 93A. In the locked position of the bolt the three fingers 93A engage three keeper slots to securely lock the gate in position. The triple finger feature of the slide bolts permits close spacing of the keeper slots which in turn provides for close adjustment in the selection of the proper location for the placement of the gate 29 in transverse position in the car to suit the various types and quantities of lading to be stowed. The triple finger feature of the slide bolts of locks 90 and 91 at the lower edge of gate 29 additionally provides support for the gate to prevent undue deflection of the trolley track 31 from the weight of the gate when the car is in motion. In the locked position the slide bolts are in supporting contact or near supporting contact with the floor keeper members 73 and 80 at surfaces 93B as shown in FIG. 9.

Referring to FIG. 12 which shows the gate 29 applied in the body 110 of a railway box car. It will be noted that the application of the gate is the same as for the refrigerator car except there being no ceiling structure in the box car the upper trackway 31 is secured to supporting brackets 111 which are suspended from each roof carline 112. The roof 113 of the box car 110 includes a plurality of the roof carlines 112 which are transversely disposed and extend across the width of the car. The carlines 112 are disposed at longitudinally spaced intervals and are supported and secured at their ends to the longitudinally disposed side plate members 114. The side plate 114 is a part of the side wall structure 115 of the car. At the lower edge of the gate 29 the stabilizer and pivot means 116 is similar to the stabilizer and pivot means 58 having a pivot pin 117 secured at its upper end portion to the gate 29 and a roller 118 which is retained on the pin at its lower end portion by a holding washer 119. The longitudinally disposed trackway 120 being somewhat different in construction from the trackway 73 provides a longitudinal groove for retaining and guiding the stabilizer and pivot means 116.

From the foregoing it will be seen that the invention provides a mounting and locking arrangement for a compartmentizer which is practical in application and operation and meets the strength requirements demanded in heavy duty freight service. Further the arrangement can be applied in various types of freight vehicles.

What is claimed is:

1. In a freight vehicle having a roof, a side wall and a floor, said side wall including a side door opening, an upper longitudinally disposed trackway secured to said roof adjacent to said side wall, a trolley movably mounted in said trackway and having a vertical depending pivot arm, a compartmentizer gate having an upper pivot supporting member at its outer edge, said member having a downwardly facing pivot supporting surface vertically spaced below the upper edge of said gate and a circular hole extending vertically through said member, said pivot arm of said trolley being circular shape in section extending downwardly through said hole of said member and having a lower end portion projecting below said supporting surface, a supporting fastener secured to said lower end portion of said pivot arm to provide an upper pivot and the sole support of said gate in said vehicle, a combined stabilizer and pivot means fixedly secured to the lower edge of said gate adjacent its outer edge, said stabilizer and pivot means extending downwardly into a lower longitudinally disposed trackway, said lower trackway being secured to said vehicle at substantially the level of said floor adjacent to said side wall and including a longitudinal groove having a top opening, said top opening being smaller in width than the lower portion of said groove for retaining and guiding said stabilizer and pivot means, said stabilizer and pivot means being vertically aligned with said upper pivot thereby providing hinging means for swinging said gate horizontally in either direction from a position normal to said side wall to a position parallel thereto and to a position wherein said gate extends through said side door opening of said side wall, said gate provided with individual manually operated locks at the upper and lower edges adjacent to the outer and inner edges thereof, said locks each including a slide bolt having a fork-shaped end with three fingers, said fingers each engaging a keeper slot provided in longitudinally disposed keeper members located at said ceiling and said floor adjacent said side wall and longitudinal center of the vehicle respectively thereby locking said gate in transverse position in said vehicle, said keeper members each having a plurality of keeper slots at longitudinally spaced intervals, said intervals of one keeper member being equal to and in vertical plane alignment with the intervals of all the other keeper members thereby providing for the placement and the locking of said gate in transverse position in said vehicle at various selective locations lengthwise of said vehicle, said slide bolts of said locks located at the lower edge of said gate being in supporting contact with said floor keeper members when said slide bolts are extended in locked position.

2. In a freight vehicle having a ceiling, a side wall and a floor, said side wall having a side door opening, an upper longitudinally disposed trackway secured to said ceiling adjacent to said side wall, said trackway having a horizontal upwardly facing surface, a trolley arrangement comprising an angular shape member having a longitudinally disposed horizontal mounting arm and a vertical depending pivot arm, said horizontal mounting arm spaced outwardly in proximate relationship with said upwardly facing surface of said trackway and having a pivot pin extending inwardly adjacent each end thereof, a roller mounted on the inner end portion of each said pivot pin and said rollers peripherally engaged with said upwardly facing surface of said trackway thereby movably supporting said trolley in said trackway, a compartmentizer gate having an upper pivot supporting member at its outer edge, said member having a downwardly facing pivot supporting surface vertically spaced below the upper edge of said gate and a circular hole extending vertically through said member, said pivot arm of said trolley being circular shape in section extending downwardly through said hole of said member and having a lower end portion projecting below said supporting surface, a supporting fastener secured to said lower end portion of said pivot arm to provide an upper pivot and the sole support of said gate in said vehicle, a combined stabilizer and pivot means fixedly secured to the lower edge of said gate adjacent its outer edge, said stabilizer and pivot means extending downwardly into a lower longitudinally disposed trackway, said lower trackway being secured to said vehicle at substantially the level of said floor adjacent to said side wall and including a longitudinal groove for retaining and guiding said stabilizer and pivot means, and said stabilizer and pivot means being vertically aligned with said upper pivot thereby providing hinging means for swinging said gate horizontally in either direction from a position normal to said side wall to a position parallel thereto and to an outwardly directed position wherein said gate extends through said side door opening of said side wall.

3. In a freight vehicle having a ceiling, a side wall and a floor, an upper longitudinally disposed trackway secured to said ceiling adjacent to said side wall, said trackway having a vertical outwardly facing surface, a horizontal downwardly facing surface extending outwardly from said outwardly facing surface, a horizontal upwardly facing surface spaced below and underlying said downwardly facing surface and an upstanding curb flange spaced outwardly from said outwardly facing surface, a trolley arrangement comprising an angular shape member having a longitudinally disposed horizontal mounting arm and a vertical depending pivot arm, said horizontal mounting arm spaced outwardly in proximate relationship with said curb flange of said trackway and having a pivot pin extending inwardly adjacent each end thereof, a roller mounted on the inner end portion of each said pivot pin and said rollers peripherally engaged with said upwardly facing surface of said trackway thereby movably supporting said trolley in said trackway, a compartmentizer gate having an upper pivot supporting member at its outer edge, said member having a downwardly facing pivot supporting surface vertically spaced below the upper edge of said gate and a circular hole extending vertically through said member, said pivot arm of said trolley being circular shape in section extending downwardly through said hole of said member and having a lower end portion projecting below said supporting surface, a supporting fastener secured to said lower end portion of said pivot arm to provide an upper pivot and the sole support of said gate in said vehicle, a combined stabilizer and pivot means fixedly secured to the lower edge of said gate adjacent its outer edge, said stabilizer and pivot means extending downwardly into a lower longitudinally disposed trackway, said lower trackway being secured to said vehicle at substantially the level of said floor adjacent to said side wall and including a longitudinal groove having a top opening, said top opening being smaller in width than the lower portion of said groove for retaining and guiding said stabilizer and pivot means, and said stabilizer and pivot means being vertically aligned with said upper pivot thereby providing hinging means for swinging said gate horizontally.

4. In a freight vehicle having a ceiling, a side wall and a floor, an upper longitudinally disposed trackway secured to said ceiling adjacent to said side wall, a trolley movably mounted in said trackway and having a vertical depending pivot arm, a compartmentizer gate having an open outer vertical edge comprising a vertically disposed channel section member having its flanges disposed outwardly and extending full height of said gate, said channel section member having horizontally disposed lugs including upper pivot guiding lugs adjacent its upper edge, an upper pivot supporting lug vertically spaced below its upper edge and a lower stabilizer and pivot supporting lug adjacent its lower edge, said lugs each extending in the area inside of said channel section and being secured to said flanges and web thereof, said upper guiding and supporting lugs each having a circular hole in vertical alignment with each other, said vertical depending pivot arm of said trolley being circular shape in section and extending through said holes of said upper guiding and supporting lugs and having a threaded lower end portion projecting below said pivot supporting lug, said pivot arm being secured by means of a threaded holding nut and lock nut applied to said lower end portion of said pivot arm adjacent to said upper supporting lug to provide an upper pivot and the sole support of said gate in said vehicle, a combined stabilizer and pivot means comprising a roller horizontally mounted on a vertical pivot pin adjacent its lower end, said pivot pin extending upwardly through said lower supporting lug of said channel of said gate at the lower edge thereof and said pin being fixedly secured to said lug, a lower longitudinally disposed trackway secured to said vehicle at substantially the level of said floor adjacent to said side wall, said lower trackway including a longitudinal groove having a top opening, said top opening being smaller in width than the lower portion of said groove, said horizontally mounted roller being disposed in said lower portion of said groove with said vertical pivot pin extending through said top opening, said top opening retaining and guiding said horizontal roller in said lower portion of said groove, and said pivot pin being vertically aligned with said upper pivot thereby providing hinging means for swinging said gate horizontally in said vehicle.

5. In a freight vehicle having side walls, a roof and a floor, said side walls each including a side door opening and a longitudinally disposed side plate member, said roof including a plurality of transversely disposed carline members spaced at intervals longitudinally of said vehicle and each extending between and secured at its ends to said side plate members, a pair of upper longitudinally disposed trackways each adjacent to one of said side walls respectively, said trackways disposed reversely with respect to each other transversely of said vehicle and secured to supporting brackets suspended from each said roof carline, said trackways each having a vertical outwardly facing surface, a horizontal downwardly facing surface extending outwardly from said outwardly facing surface, a horizontal upwardly facing surface spaced below and underlying said downwardly facing surface and an upstanding curb flange spaced outwardly from said outwardly facing surface, a trolley movably mounted in each said trackway, said trolleys each having a vertical depending pivot arm, a pair of mated compartmentizer gates each having an upper pivot supporting member at its outer edge, said member having a downwardly facing pivot supporting surface vertically spaced below the upper edge of said gate and a circular hole extending vertically through said member, said pivot arms of said trolleys each being circular shape in section extending downwardly through said hole of one of said members respectively and each having a lower end portion projecting below said supporting surface, a supporting fastener secured to said lower end portion of each said pivot arm to provide an upper pivot and the sole support of each said gate in said vehicle, a combined stabilizer and pivot means fixedly secured to the lower edge of each said gate adjacent its outer edge, said stabilizer and pivot means extending downwardly into one of a pair of lower longitudinally disposed trackways, said lower trackways each being secured to said vehicle at substantially the level of said floor each adjacent to one of said side walls and each including a longitudinal groove for retaining and guiding said stabilizer and pivot means, and each said stabilizer and pivot means being vertically aligned with said upper pivot of each said gate respectively thereby providing hinging means for swinging said gates horizontally in either direction from a position normal to said side walls to a position parallel thereto and to an outwardly directed position wherein said gates extend through said side door openings of said vehicle.

6. In a refrigerator freight vehicle having side walls, a ceiling and a floor, said side walls each including a longitudinally disposed side plate member, said ceiling including a plurality of transversely disposed supporting members spaced at intervals longitudinally of said vehicle and each extending between and secured at its ends to said side plate members, a pair of upper longitudinally disposed trackways each adjacent to one of said side walls respectively, said trackways disposed reversely with respect to each other transversely of said vehicle and secured to said ceiling supporting members, said trackways each having a vertical outwardly facing surface, a horizontal downwardly facing surface extending outwardly from said outwardly facing surface, a horizontal upwardly facing surface spaced below and underlying said downwardly facing surface and an upstanding curb flange spaced outwardly from said outwardly facing surface, a trolley movably mounted in each said trackway, said trolleys each having a vertical depending pivot arm, a pair of mated compartmentizer gates each having an upper pivot supporting member at its outer edge, said member having a downwardly facing pivot supporting surface vertically spaced below the upper edge of said gate and a circular hole extending vertically through said member, said pivot arms of said trolleys each being circular shape in section extending downwardly through said hole of one of said members respectively and each having a lower end portion projecting below said supporting surface, a supporting fastener secured to said lower end portion of each said pivot arm to provide an upper pivot and the sole support of each said gate in said vehicle, a combined stabilizer and pivot means fixedly secured to the lower edge of each said gate adjacent its outer edge, said stabilizer and pivot means extending downwardly into one of a pair of lower longitudinally disposed trackways, said lower trackways each being secured to said vehicle at substantially the level of said floor each adjacent to one of said side walls and each including a longitudinal groove having a top opening, said top opening being smaller in width than the lower portion of said groove for retaining and guiding said stabilizer and pivot means, and each said stabilizer and pivot means being vertically aligned with said upper pivot of each said gate respectively thereby providing hinging means for swinging said gates horizontally, said gates each provided with individual manually operated locks at the upper and lower edges adjacent to the outer and inner edges thereof, said locks each having a slide bolt engaging keeper slots provided in longitudinally disposed keeper members located at said ceiling and said floor adjacent said side walls and longitudinal center of the vehicle respectively thereby locking said gates in transverse position in said vehicle, said keeper members each having a plurality of keeper slots at longitudinally spaced intervals, said intervals, of one keeper member being equal to and in vertical plane alignment with the intervals of all the other keeper members thereby providing for the placement and the locking of said gates in transverse position in said vehicle at various selective locations lengthwise of said vehicle, said slide bolts of said locks located at the lower edges of said gates being in supporting contact with said floor keeper members when said slide bolts are extended in locked position.

7. In a freight vehicle having a ceiling, a side wall and a floor, an upper longitudinally disposed trackway secured to said ceiling adjacent to said side wall, said trackway having a vertical outwardly facing surface, a horizontal downwardly facing surface extending outwardly from said outwardly facing surface, a horizontal upwardly facing surface spaced below and underlying said downwardly facing surface and an upstanding curb flange spaced outwardly from said outwardly facing surface, a trolley arrangement comprising an angular shape member having a longitudinally disposed horizontal mounting arm and a vertical depending pivot arm, said horizontal mounting arm spaced outwardly in proximate relationship with said curb flange of said trackway and having a pivot pin extending inwardly adjacent each end thereof, a roller mounted on the inner portion of each said pivot pin and said rollers peripherally engaged with said upwardly facing surface of said trackway thereby movably supporting said trolley in said trackway, a compartmentizer gate having an upper pivot supporting member at its outer edge, said member having a downwardly facing pivot supporting surface vertically spaced below the upper edge of said gate and a circular hole extending vertically through said member, said pivot arm of said trolley being circular shape in section extending downwardly through said hole of said member and having a lower end portion projecting below said supporting surface, a supporting fastener secured to said lower end portion of said pivot arm to provide an upper pivot and the sole support of said gate in said vehicle, a combined stabilizer and pivot means comprising a roller horizontally mounted on a vertical pivot pin adjacent its lower end, said pivot pin being fixedly secured to the lower edge of said gate adjacent its outer edge, and extending downwardly into a lower longitudinally disposed trackway, said lower trackway being secured to said vehicle at substantially the level of said floor adjacent to said side wall and including a longitudinal groove having a top opening, said top opening being smaller in width than the lower portion of said groove, said horizontally mounted roller being disposed in said lower portion of said groove with said vertical pivot pin extending through said top opening, said top opening retaining and guiding said horizontal roller in said lower portion of said groove, said pivot pin being vertically aligned with said upper pivot thereby providing hinging means for swinging said gate horizontally, said rollers of said trolley being proportionately spaced longitudinally of said vehicle to prevent said gate from canting when said gate is in a position parallel to said side wall of said vehicle, said lower portion of said lower trackway groove having an inner and an outer vertical wall portion and said horizontally mounted roller of said stabilizer and pivot means being peripherally engaged with said outer vertical wall portion when said gate is in a position normal to said side wall of said vehicle thereby preventing said gate from canting.

8. In a freight vehicle having a roof, a side wall and a floor, said side wall including a side door opening, an upper longitudinally disposed supporting trackway secured to said roof adjacent to said side wall, a trolley arrangement comprising an angular shape member having a horizontal mounting arm and a vertical depending pivot arm, a pivot pin secured to and extending outwardly from said horizontal mounting arm adjacent each end thereof, a roller mounted on the outwardly extending end portion of each said pin, said trolley being movably mounted in said longitudinally disposed supporting trackway in said freight vehicle, said vertical depending pivot arm being circular shape in section and having a threaded lower end portion, a compartmentizer gate having an upper pivot supporting member at its outer edge, said member having a downwardly facing pivot supporting surface vertically spaced below the upper edge of said gate and a circular hole extending vertically through said member, said pivot arm of said trolley extending downwardly through said hole of said member and said lower end portion projecting below said supporting surface, said pivot arm being secured to said gate by means of a threaded holding nut and lock nut applied over said threaded lower end portion to provide an upper pivot and the sole support of said gate in said vehicle a combined stabilized and pivot means comprising a roller horizontally mounted on a vertical pivot pin, said pivot pin extending upwardly and fixedly secured to said gate, said roller being retained and guided in a longitudinally disposed groove of a trackway in said vehicle thereby providing a hinge pivot at the lower portion of said gate, said pivot pin being vertically aligned with said upper pivot thereby providing hinging means for swinging said gate horizontally in either direction from a position normal to a side wall of said vehicle to a position parallel thereto and to an outwardly directed position wherein said gate extends through said side door opening of said vehicle, said rollers of said trolley being proportionately spaced longitudinally of said vehicle to prevent said gate from canting when said gate is in a position parallel to said side wall of said vehicle, said groove of said lower trackway having an inner and an outer vertical wall portion and said horizontally mounted roller being peripherally engaged with said outer vertical wall portion when said gate is in a position normal to said side wall of said vehicle thereby preventing said gate from canting.

9. In a compartmentizer gate having double plates in parallel spaced relationship including stiffener members disposed between and secured to said plates, a lock comprising a rectangular box like housing unit flush mounted to said gate through a rectangular opening in one plate of said gate and having the long sides of said unit vertically disposed, said unit having an open front and a back portion having openings to facilitate the assembly and operation of the movable parts of said lock including a slide bolt vertically disposed between said plates of said gate, said slide bolt having a fork-shaped end with three fingers extending through the lower edge of said gate for engagement with keeper slots when said bolt is in locked position, said slide bolt being rectangular shape in section at its lower portion and slidably mounted and guided vertically in said gate, said slide bolt extending upwardly and being offset from intermediate the two plates of said gate at said lower portion to a space between the back of said housing unit and closely adjacent plate of said gate and being slidably guided vertically therebetween against motion in direction normal to said gate, said housing unit having vertically disposed webs extending outwardly from its back portion for slidably guiding the upper portion of said slide bolt against motion in direction parallel to said gate, said upper portion of said slide bolt having a front directed toothed rack portion, an operating handle pivotally mounted in said housing unit, said operating handle having a toothed wheel portion at its inner end in said housing unit, said toothed wheel portion engaging said toothed rack portion of said slide bolt to form a gear whereby said slide bolt is raised and lowered by manual operation of the outer end of said operating handle in a direction normal to said gate, said lock being arranged so that upward operation of said outer end of handle lowers said slide bolt to locked position and downward operation of said outer end of handle raises said slide bolt to unlocked position, a latch pivotally mounted on the sides of said housing unit for holding said slide bolt in unlocked position and a second latch pivotally mounted on the back portion of said housing unit for holding said operating handle in locked position, said outer end of handle in the unlocked position protruding beyond the face of said gate thereby providing a warning signal that said slide bolt is in the unlocked position, said latches each being arranged to lock automatically and release manually.

10. A lock for a compartmentizer gate, said gate having double plates in parallel spaced relationship including stiffener members disposed between and secured to said plates, said lock comprising a rectangular box like housing unit arranged for flush application to said gate through a rectangular opening in one plate of said gate and having the long sides of said unit vertically disposed, said unit having an open front and a back portion having openings to facilitate the assembly and operation of the movable parts of said lock including a slide bolt vertically disposed between said plates of said gate, said slide bolt having a fork-shaped end with three fingers extending through the lower edge of said gate, said fingers for engagement with keeper slots when said bolt is in locked position, said lower part of slide bolt being rectangular shape in section and slidably mounted in a vertically disposed sleeve arrangement in said gate, said slide bolt having an upper part secured to said lower part and extending upwardly to said housing unit, said upper part of slide bolt being offset from intermediate the two plates of said gate at the top of said lower part of slide bolt to a space between the back of said housing unit and closely adjacent plate of said gate and being slidably guided vertically therebetween against motion in direction normal to said gate, said housing unit having vertically disposed webs extending outwardly from its back portion for slidably guiding said upper part of slide bolt against motion in direction parallel to said gate, said upper part of slide bolt having a front directed toothed rack portion and a top holding hook, an operating handle pivotally mounted in said housing unit with a hinge pin disposed parallel to said gate extending outwardly on each side of said handle and through said vertical sides of said housing unit, said operating handle having a toothed wheel portion at its inner end in said housing unit, said toothed wheel portion engaging said toothed rack portion of said slide bolt to form a gear whereby said slide bolt is raised and lowered by manual operation of the outer end of said operating handle in a direction normal to said gate, said lock being arranged so that upward operation of said outer end of handle lowers said slide bolt to locked position and downward operation of said outer end of handle raises said slide bolt to unlocked position, a latch pivotally mounted on the sides of said housing unit for holding said slide bolt at said top holding hook in unlocked position and a second latch pivotally mounted on the back portion of said housing unit for holding said operating handle in locked position, said outer end of handle in the locked position being enclosed in said housing unit to provide a flush surface, said latches each being arranged to lock automatically and release manually.

11. In a compartmentizer gate having double plates in parallel spaced relationship including stiffener members disposed between and secured to said plates, a lock comprising a rectangular box like housing unit flush mounted to said gate through a rectangular opening in one plate of said gate, said unit having an open front and a back portion having openings to facilitate the assembly and operation of the movable parts of said lock including a slide bolt disposed between said plates of said gate in parallel direction to the long sides of said housing unit, said slide bolt extending through one edge of said gate for engagement with a keeper slot when said bolt is in locked position, said slide bolt being rectangular shape in section and slidably mounted and guided in said gate and extending from the end of the bolt adjacent said edge of said gate to a space between the back of said housing unit and closely adjacent plate of said gate and being slidably guided therebetween against motion in direction normal to said gate, said housing unit having webs in parallel direction to said slide bolt extending outwardly from its back portion for slidably guiding said slide bolt against motion in direction parallel to said gate, said slide bolt having a front directed toothed rack portion and a holding hook at its end portion adjacent said housing unit, an operating handle pivotally mounted in said housing unit, said operating handle having a toothed wheel portion at its inner end in said housing unit, said toothed wheel portion engaging said toothed rack portion of said slide bolt to form a gear whereby said slide bolt is slidably extended and retracted by manual operation of the outer end of said operating handle in a direction normal to said gate, said lock being arranged so that operation of said outer end of handle in direction opposite to said edge of said gate extends said slide bolt to locked position with said outer end of handle being enclosed in said housing unit to provide a flush surface and operation of said outer end of handle in direction toward said edge of said gate retracts said slide bolt to unlocked position with said outer end of handle protruding beyond the face of said gate thereby providing a warning signal that said slide bolt is in the unlocked position, a latch pivotally mounted on the sides of said housing unit for holding said slide bolt at said holding hook in unlocked position and a second latch pivotally mounted on the back portion of said housing unit for holding said operating handle in locked position, said latches each being arranged to lock automatically and release manually.

References Cited in the file of this patent

UNITED STATES PATENTS

| | | |
|---|---|---|
| 1,025,527 | Hunt | May 7, 1912 |
| 2,155,463 | Angell | Apr. 25, 1939 |
| 2,227,807 | Dixon | Jan. 7, 1941 |
| 2,517,823 | Angell | Aug. 8, 1950 |
| 2,674,207 | Kerbaugh et al. | Apr. 6, 1954 |
| 2,911,925 | Adler et al. | Nov. 10, 1959 |